Figure 1:
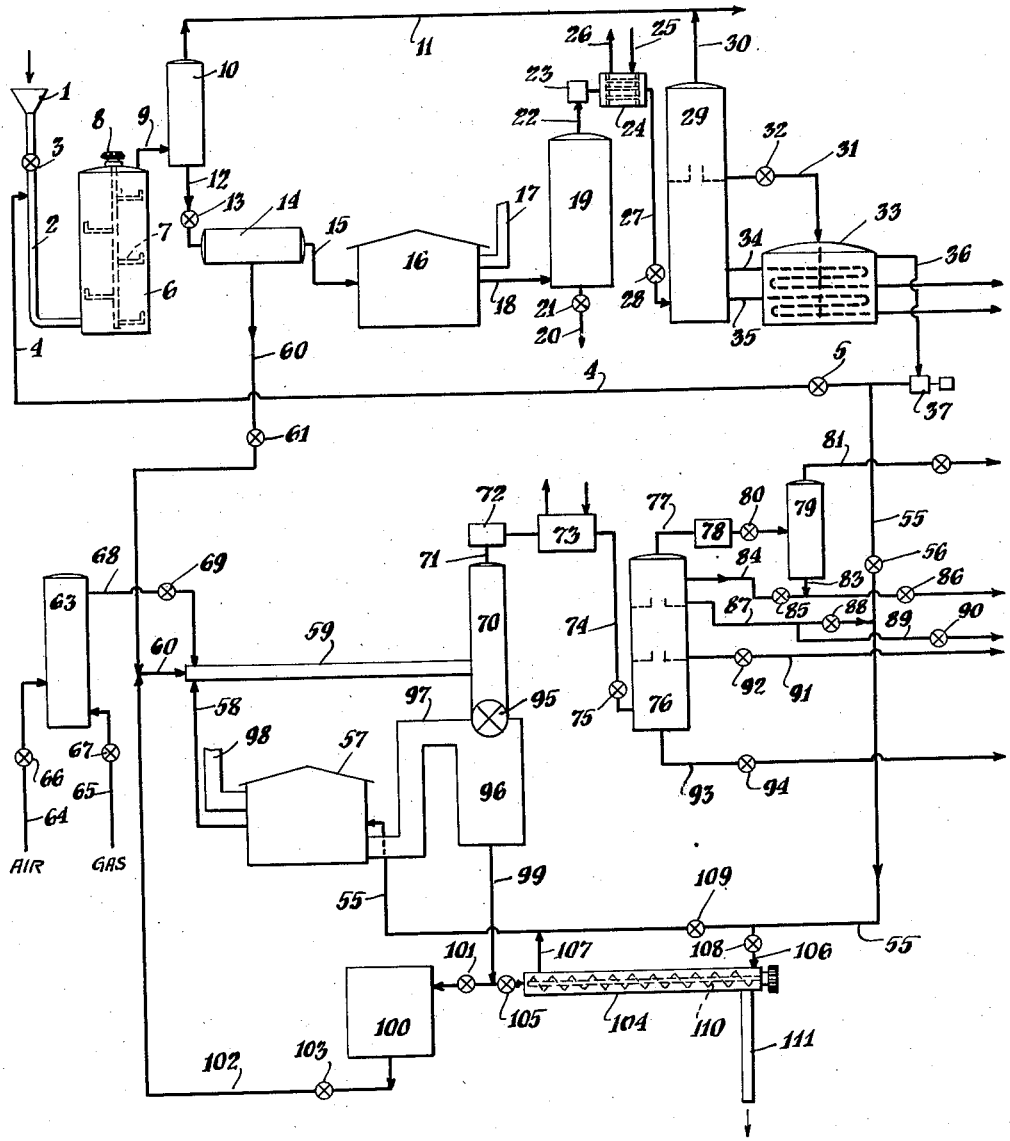

Nov. 29, 1949   J. W. COAST   2,489,701
RECOVERY OF VALUES FROM ROCK
ASPHALT AND LIKE MATERIAL

Filed July 20, 1946   2 Sheets-Sheet 1

INVENTOR
John W. Coast
BY
Ernest D. Given
ATTORNEY

Nov. 29, 1949

J. W. COAST 2,489,701

RECOVERY OF VALUES FROM ROCK
ASPHALT AND LIKE MATERIAL

Filed July 20, 1946

2 Sheets-Sheet 2

INVENTOR
John W. Coast
BY
Ernest D. Givin
ATTORNEY

Patented Nov. 29, 1949

2,489,701

UNITED STATES PATENT OFFICE 2,489,701

RECOVERY OF VALUES FROM ROCK ASPHALT AND LIKE MATERIAL

John W. Coast, Dallas, Tex., assignor of one-half to Clarence H. Dragert, Dallas, Tex.

Application July 20, 1946, Serial No. 685,067
In Cuba August 4, 1945

2 Claims. (Cl. 196—50)

The present invention relates to a process for the treatment of rock asphalt, oil shales and like material, which contain both oil-soluble hydrocarbon and oil-insoluble inorganic portions, to recover valuable petroleum products therefrom.

More particularly the present invention relates to a process as above set forth, wherein provision is made for producing cracked petroleum products, including high octane gasoline, by a cracking operation taking place in the presence of clay type material, which is derived from and is a part of the original raw material on which the process is intended to operate.

While the present process is considered to be applicable to many types of rock asphalt, oil shales, oil sands and other similar raw materials found in various parts of the world, it is particularly adapted for the treatment of this type of material which is found in Cuba, wherein the material consists of somewhat over 50% oil-soluble hydrocarbon or bituminous material and the remainder a fine volcanic ash, which has a composition similar in many respects to certain clays.

The problem of treating such material for the recovery of values therefrom involves two basic elements, first the separation of the inorganic materials from the organic hydrocarbon materials, and second the separation of the hydrocarbon materials into selected individually usable fractions or portions, which may be used as such for various known purposes. Various solutions of this problem are disclosed in my copending application in the United States, Serial No. 685,-066, filed July 20, 1946, this application having to do particularly with a separation effected between a solution in oil of the oil-soluble material from the major portion of the inorganic material by a process based upon specific gravity difference. I have also disclosed in Cuban application Ser. No. 97,802, filed August 4, 1945, a process relating particularly to the effecting of this separation by volatilizing substantially all the volatile portions of the oil-soluble material of the raw material and the solvent leaving as a residue the inorganic materials and some relatively non-volatile organic materials, portions of which latter may be recovered in one form or another. The present invention may employ either or both of these means of separation, but emphasizes particularly the cracking of products resulting from straight run operations to produce cracked petroleum products including, for example, high test or high octane gasoline.

It has previously been proposed to use a so-called "fluid catalyst" method of obtaining high octane gasoline by a cracking operation in the presence of a relatively large quantity of clay type material such as or similar to fuller's earth. Here, however, the clay material, which is used, possibly as a catalyst, but in any event to assist the cracking operations in the making of high octane gasoline, must all be obtained from external sources and any such material which is used up or lost in the process must be replenished from such external sources.

A primary object of the present invention is to effect a cracking operation similar in some respects to that comprising the known "fluid catalyst" cracking but wherein the so-called "catalyst" is derived partly or wholly from the original raw material supplied to the process, so that in the normal operation of the process, there will always be obtained as one of the final products of the process an amount of this clay type material, substantially equal to that amount which is continuously being supplied to the process as one of the ingredients of the raw material. In this way, the present process will be not only substantially as efficient as the process heretofore known from the point of view of the resultant hydrocarbon products produced thereby, but also will be much cheaper as it is unnecessary to look elsewhere for the clay type material used in effecting the cracking operation.

Figure 2:
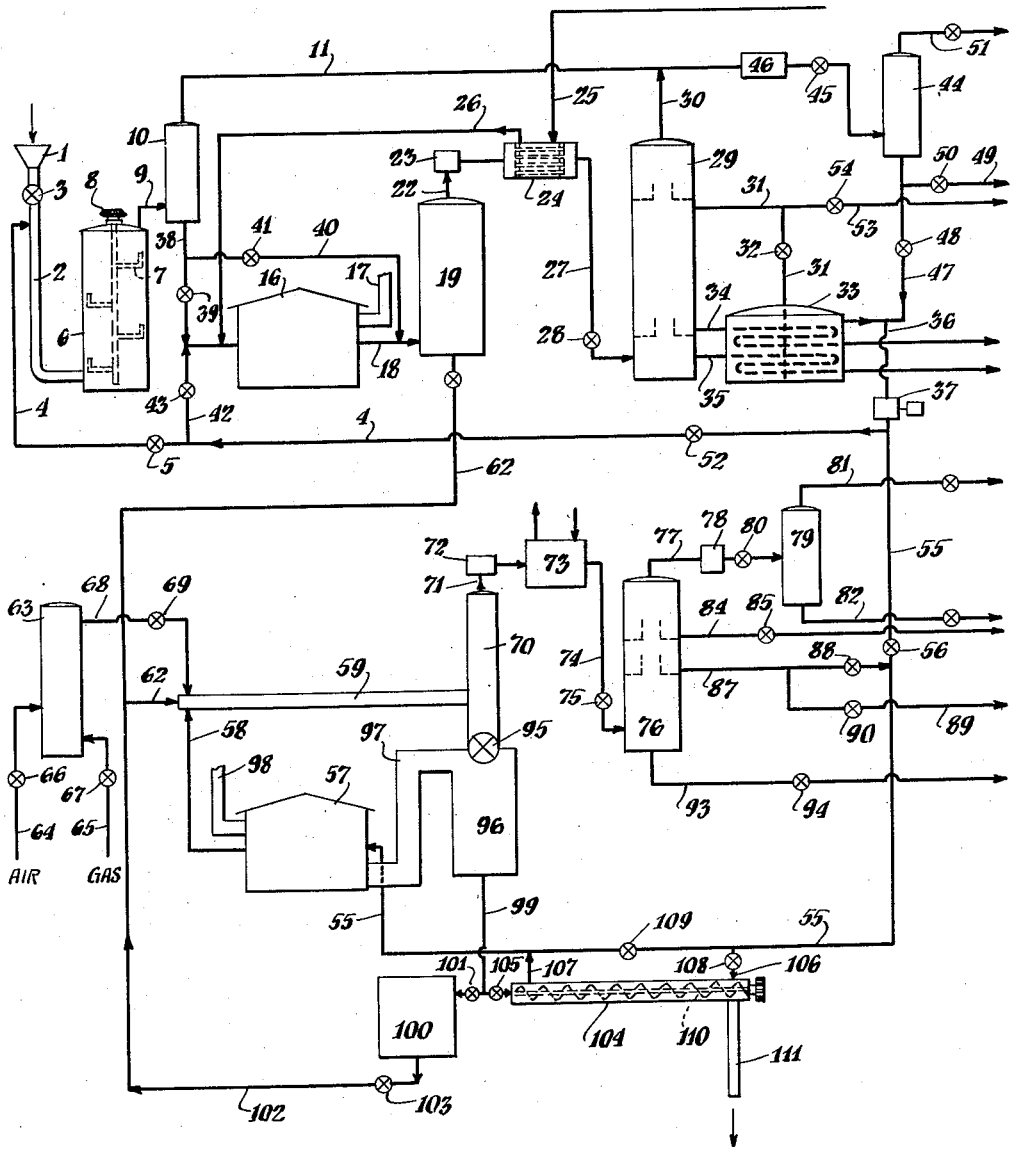

Further detailed objects of the present invention include the provision of process steps for reactivating the inorganic material used in the cracking operation and re-cycling this reactivated material to a selected extent; provisions for the saving of heat throughout the process by the use of suitable heat interchangers; and other provisions as to method or process which have now become accepted practices throughout the oil refining industry. Other and more detailed objects of the present invention will become apparent from the following specification and appended claims, when taken in connection with the accompanying drawings, in which:

Figure 1 is a diagrammatic view illustrating one form of equipment by which the process of this invention may be carried out; and Fig. 2 is a similar view illustrating another form of such equipment for the carrying out of a slightly modified process in accordance with this invention.

Inasmuch as the two forms shown in Figs. 1 and 2 of the accompanying drawings have many features of process and many structural elements in common, such common structural elements will be given the same reference characters and the description thereof will not be repeated in detail.

The first operation in treating material of the kind above set forth is to dissolve the oil-soluble portion thereof in a solvent, which is obtained from a subsequent step of the process, and is largely material of the type known in the art as "gas oil." This solution is preferably facilitated by first comminuting the raw material or may take place either without such comminution or simultaneously therewith as desired. In accordance with the present teachings, it is assumed that the material supplied to the apparatus hereinafter generally described is first comminuted, so that a major portion is of a size range of 30 to 40 mesh. This material is supplied to a hopper 1 and passes thence to a standpipe 2 under control of a suitable valve mechanism 3, such as a proportioning valve which controls and regulates the rate of feed of the material to the standpipe 2. As shown there is introduced into the upper portion of the standpipe 2 a supply of solvent which passes thereto through a line 4 under control of a valve 5 in this line. The material thus partially mixed flows, preferably by gravity, to a mixing tank 6 having associated therewith means for thoroughly mixing the materials and thus facilitating the solution of the oil-soluble portion of the raw material. In the present instance this mixing means is shown as a stirrer 7 suitably mounted in the tank 6 for rotation and arranged to be driven by any desired means (not shown) associated with a gear 8 secured to the upper end of the stirrer 7. It is preferred that the mixing and solution take place with the material hot, so as to facilitate solution and also to keep the viscosity of the solution down to a desired point. For this purpose the temperature of the incoming solvent and possibly also of the incoming raw material is such that the solution will take place with the mixed materials in a temperature range of about 250° to about 450° F. and with a preferred temperature of about 350° F.

Material passes from the mixing tank through a line 9 to a vapor separator 10 wherein any constituents of the material which will vaporize at the temperature existing within the separator 10 may pass off through a vapor line 11 from the top of this vapor separator to a subsequent step or part of the process hereinafter to be described. Thus far the description applies to both forms of the invention shown in Figs. 1 and 2 of the drawings.

Referring now to Fig. 1 of the accompanying drawings, the liquid from the vapor separator 10 passes through a line 12 from the lower portion thereof and under control of a valve 13 in this line to a separation equipment 14, wherein a separation is effected between liquid and solid materials to a very large extent. In the usual case this separation will be sufficiently complete that about 90% to 100% of the solid materials along with some solvent liquid will be separated from the remaining primarily liquid material.

This separation equipment may take various forms as set forth more particularly in my aforesaid copending application in the United States, Serial No. 685,066, filed July 20, 1946. It may comprise continuous or intermittent filtering equipment or it may involve a separation based upon specific gravity difference and including any one or more of the following types of equipment: (a) settling tanks; (b) clarifiers or classifiers such as those made by the Dorr Co.; or (c) intermittent or continuous centrifugal separation equipment. While all these types of equipment may be equally effective from the point of view of separation between the two types of materials as aforesaid, it is presently preferred to use continuous centrifugal separation wherein the separation is effected based upon specific gravity difference. Any of the other named means for separation is, however, to be considered within the purview of this invention and within the scope of the appended claims, which are not otherwise specifically restricted to some one named type of separation at this point.

The liquid material resulting from this separation may pass from the apparatus 14 through a line 15 to a pipe still heater 16 wherein it may be heated up to a relatively high temperature sufficient to vaporize most, if not all, of the volatile constituents thereof. This temperature is contemplated to be in the range of about 750° to 950° F. and preferably about 850° F. It will be understood that the heat may be supplied to the pipe still heater in any usual manner as by the combustion in a suitable combustion space of any available fuel, a stack 17 for the products of combustion being indicated on the accompanying drawing. Material passes from the pipe still heater 16 through a line 18 to a vapor separator 19, wherein volatile constituents are separated from the non-volatile residue including substantially all the inorganic materials, which have not previously been separated from this portion of the material flowing out of the equipment or apparatus 14. Such non-volatile materials may pass from the lower portion of the vapor separator 19 through a line 20 under control of a suitable valve mechanism 21 for such use as they may be put. No further details of this use or treatment of this material will be included in the present application as they form per se no necessary part of this invention.

Vapor passes from the upper end portion of the separator 19 through a line 22, in which is preferably interposed an apparatus 23 for removing remaining solid particles therefrom, this apparatus preferably being of well known electrical type such as a Cottrell separator. Line 22 passes to a heat interchanger 24 in which the temperature of the vapor is reduced to some extent and the heat thus obtained utilized for heating other material not specifically disclosed herein, but which may pass to and from the interchanger through lines indicated at 25 and 26. The somewhat cooled vapors pass thence through a line 27 under control of a valve 28 to a fractionating tower 29, which may be of the well known bubble type.

In the fractionating tower the usual and well known fractional condensation takes place, resulting in a desired number of different fractions having different specific gravities. Only a few fractions of these are indicated on the accompanying drawings. As shown there is a line 30 from the top of this tower for non-condensible gases and vapors, which line joins the line 11, so that vapor from both lines pass to a suitable point (not shown). Straight run gasoline may also be drawn from the fractionating tower 29. As shown, however, there is a line 31 from which a fraction, preferably having the characteristics of "gas oil" is drawn. This material serves, in accordance with the present invention, for two essential purposes, first as a source of solvent for supply to the dissolving step of the process through the line 4, and second, as a source of cracking stock or material to be cracked in accordance with the principles of this invention as hereinafter to be set forth in detail.

In order that the material flowing through the line 31 under control of a valve 32 in this line may be further heated, as heat is needed irrespective of which of the uses above set forth the material is to be put, it is passed to a heating and storage tank 33 in which are heating coils as shown; and some of the heavier fractions withdrawn from the tower 29 pass through the lines 34 and 35, thence through these heating coils en route to their delivery or collection points, as these heavier fractions come out of the tower at substantially higher temperatures than that of the material passing through the line 31. A line 36 having interposed therein a pump mechanism 37 serves for the flow of this material from the upper portion of the tank 33 to the line 4 and also to the cracking portion of the process hereinafter to be described. The particular description thus far given of the Fig. 1 form of the invention corresponds substantially to a similar part of the disclosure of my copending United States application Serial No. 685,066, filed July 20, 1946 and may be amplified by various of the details more specifically given in that application.

In the form of the invention shown in Fig. 2, the liquid material from the separator 10 passes from the lower portion thereof through a line 38 under control of a valve 39, direct to the pipe still heater 16, through which all the materials (except as hereinafter set forth), including the inorganic material in suspension, pass and are heated. This material passes thence through the line 18 to the vapor separator 10 as in the form previously described. Here, however, it may be desired that some of the material from the vapor separator 10 by-pass the pipe still heater 16. For this purpose a by-pass line 40 is provided having a valve 41 therein and extending between the lines 38 and 18 as shown. Furthermore, if it is desired to dilute the material passing through the pipe still heater 16 in this form of the invention, a second by-pass 42 is provided between the line 4 and the line 38, a valve 43 being provided in this line for controlling the flow therethrough. In this way the degree of dilution of the material flowing through the pipe still heater 16 may be controlled and the temperature of the materials flowing through the line 18 to the vapor separator 19 may also be controlled by controlling the amount of material passing through the line 40.

In this form of the invention, the line 25 is shown coming from a source (not shown), which may be a reservoir for permanent gases of a reducing character, the line 26 being shown joining the line 38 intermediate the valve 39 and the pipe still heater 16, so as to introduce these gases into the flow of material passing through the pipe still heater. This is often useful in treatment of materials containing substantial amounts of sulfur as the reducing gases react with such sulfur to form hydrogen sulfide, which may be recovered from the gases passing out of the top of the tower 29 through the line 30 by scrubbing these gases with an absorbent liquid.

In this form of the invention the line 30 joins the line 11 and thence is shown passing to a vapor separator 44 under control of a valve 45. Interposed in this line prior to the valve 45 is a suitable cooler 46, which serves to reduce the temperature of the vapors and gases passing therethrough up to a point such as permit the condensation of any normally liquid materials. These materials are separated from the permanent gases in the vapor separator 44 and pass from the lower end thereof through a line 47, which joins the line 36 previously described. The line 47 has a valve 48 therein controlling the flow of this material to join the line 36. If desired, however, a part or all of this material may pass out to a desired collection point through a branch line 49 under control of a valve 50 therein. Permanent gases pass from the vapor separator 44 through a line 51 to a suitable gas collection point and preferably pass through one or more scrubbing towers (not shown) en route thereto, these gases being used for any desired purpose and being preferably in part returned through the line 25 above described. There is also shown a valve 52 in the line 4 between the pump mechanism 37 and the branch line 42 and beyond the point where a line passes to the cracking portion of the system hereinafter to be described. Furthermore, it may be desired to withdraw from the system a part of the gas oil withdrawn from the tower 29 through the line 31. For this purpose a branch line 53 is shown having a valve 54 therein.

The subject matter described hereinabove and which is shown in Fig. 2 of the accompanying drawings is described in greater detail in my copending Cuban application Serial No. 97,082, filed Aug. 4, 1945.

Considering now the cracking portion of the process per se, it will be noted that the forms shown in both Figs. 1 and 2 are substantially identical as to this phase of the operation. The various elements will therefore be referred to by the same reference characters.

In both figures of the drawings, the cracking stock is withdrawn from the line 4 on the output side of the pump 37 and passes through a line 55 under control of a valve 56 therein to and through a heating furnace 57, which may be essentially similar to the pipe still heater 16 above described. This oil or cracking stock may pass thence through a line 58 to a cracking chamber 59. It is also desired to supply to the cracking chamber a clay type material to act in some way, the details of which are not clearly understood, but which may resemble catalysis. In accordance with the present invention the source of this clay type material is the inorganic material entering the process with and as a part of the raw material supplied thereto as aforesaid. This inorganic material passes, in the form of the invention shown in Fig. 1, through a line 60 from the specific gravity separation equipment 14 directly to the cracking chamber 59 under control of a valve 61. While this material has some organic materials therewith, this will not interfere with the cracking operation to any substantial extent as the clay material is to be mixed with an organic oil charge of the cracking chamber.

In the Fig. 2 form of the invention the inorganic material is separated from the organic material in the separator 19 and passes from the lower portion thereof through a line 62 under control of a suitable valve therein, as shown to the cracking chamber 59. Here again there will be some organic material mixed with this clay or inorganic material, although a relatively smaller amount than in the Fig. 1 form and of less volatile character. This difference is substantially immaterial from the point of view of the operations taking place in the cracking chamber and subsequent thereto as hereinafter to be described.

It is necessary that the materials during their passage through the cracking chamber be brought up to a relatively high temperature, which is contemplated to be within outside limits of about 850° to about 1400° F. and preferably within the somewhat narrower range of about 1000° to about 1100° F. For certain materials, for example, this range may be even more specific and is contemplated to be in the order of magnitude of about 1050° F. This heating may be accomplished in several ways. It is contemplated for example that the heating may be effected internally by supplying to the cracking chamber a highly heated fluid material, such as products of combustion as hereinafter specifically to be described. It is further contemplated that the heating of the materials in the cracking chamber may be external, so that the chamber itself acts as a muffle. It is also contemplated that any of the clay materials, that is any desired part or all of them, may be heated to a sufficiently high temperature so that the heat contained therein as introduced into the cracking chamber will be sufficient to raise the entire contents of this chamber to the desired temperature range as aforesaid. Any of these processes or any combination thereof is to be considered within the purview of this invention and within the intended scope of the appended claims, except as such claims may be further specifically limited.

As shown, there is provided a generator 63 for products of combustion, to which air and gas are respectively supplied through lines 64 and 65 having respectively interposed therein control valves 66 and 67. Products of combustion from the generator 63 may pass through a line 68 under control of a suitable valve 69 therein to the cracking chamber 59 to mix with the materials therein and establish and maintain the desired temperature conditions in this chamber.

Material passes from the right hand end as seen in the drawings of the cracking chamber 59 to a reaction chamber 70 which also serves as a vapor separator, the vapor passing from the upper end of this chamber and solid materials including the inorganic clay material and any non-volatile materials remaining therewith pass out through the lower end of this chamber.

Tracing first the course of the vapor from the chamber 70, this vapor may pass through a line 71 from the upper portion thereof, through a device 72, for separating solid particles from the vapor and which may be essentially similar to the device 23 above described. Thence the vapor passes to and through a heat interchanger 73, wherein the vapors are cooled somewhat and thence through a line 74 under control of a valve 75 to a fractionating tower 76, which may be essentially similar to the tower 29 previously described. By suitable control of the valve 75, desired pressures may be maintained in the cracking chamber 59 and in the reaction chamber or separator 70.

Uncondensed material and gases from the upper end of the tower 76 may pass through a line 77, thence through a cooler 78 to a vapor separator 79, a valve 80 being interposed in the line 77 for suitable control purposes. The products of combustion and other non-condensible gases will pass from the vapor separator 79 through a line 81 to any other suitable mechanism by which any values remaining in these gases may be recovered and the remaining gases discharged to the atmosphere through a stack. Suitable valves, not numbered, may be interposed in the lines 81 and 82 to maintain a desired pressure in the vapor separator 79 and some previous parts of the system. Liquid materials condensed in the cooler 78 and separated from the gases in the separator 79 may pass from the lower end thereof through a line 82 (Fig. 2) to a suitable point of use or through a line 83 (Fig. 1) to mix with cracked gasoline passing from the upper portion of the tower 76 through a line 84, suitable valves 85 and 86 being interposed in this line as shown. Either of these arrangements may be used as desired.

Another material which may be withdrawn from the tower 76 is a material in the gas oil range of specific gravities, that is one having the essential characteristics of the gas oil above described or the cracking stock, which is used to be supplied to the cracking chamber 59 as aforesaid. This material may be withdrawn from the tower 76 through a line 87 and a selected part thereof may pass to the line 55 under control of a valve 88 in the line 87 for re-cycling as may be desired. The balance of it may pass through a branch line 89 under control of a valve 90 therein to a suitable collection point. It will be understood that re-cycling of the gas oil from the tower 76 may be used or not as desired or a selected proportion of this material may be re-cycled, all within the purview of this invention.

In Fig. 1, one of the heavier fractions, for example fuel oil, may be withdrawn from a lower portion of the tower 76 through a line 91 under control of a valve 92. In both figures a line 93 is shown from the bottom of the tower 76 for heavy tarry material, which may flow to a desired collection point under control of a valve 94 in this line.

The residue material including substantially all the inorganic material and any non-volatile organic materials remaining therewith may pass from the bottom of the reaction chamber 70 through a suitable valve mechanism 95 to a combustion chamber diagrammatically illustrated at 96, the valve 95 being so designed as to feed this solid material to thte furnace at a predetermined desired rate and to prevent to a substantial extent at least, flow of products of combustion from the combustion chamber into the reaction chamber 70. In the combustion chamber 96 a suitable amount of air may be supplied in any manner not particularly shown to burn out from the inorganic materials any remaining organic and hence combustible material remaining therewith and thus to effect a re-activation of the inorganic or clay type materials. If desired, or found necessary, a suitable amount of fluid fuel may be introduced into the combustion chamber 96 to insure the operations aforesaid and for supplying a desired amount of products of combustion to the heater 57. Products of combustion from the combustion chamber 96 may pass through a suitable conduit 97 to the pipe still heater or furnace 57, so as to heat the oil or cracking stock passing therethrough between the pipes 55 and 58, these products of combustion exhausting through a suitable stack 98.

The remaining inorganic materials, which have been reactiviated as aforesaid and which now contain substantially no organic materials, may pass from the combustion chamber 96 through a suitable means here indicated by the line 99 and a part of them be supplied to a storage chamber 100 for this material under control of valve mechanism generally indicated at 101. This material is preferably kept hot as far as possible and may pass thence through suitable means indicated by the line 102 under control of a valve mechanism 103 to the lines 60 or 62 en route to the cracking chamber 59.

It is contemplated that in accordance with the best practice now in use in the "fluid cracking" of petroleum products above referred to, a substantial amount of clay type material will be re-cycled in this way, so that there will be a predetermined desired ratio of clay to organic material in the cracking chamber 59. The apparatus herein described is susceptible of operation for establishing any desired predetermined ratio of re-cycled inorganic material, so as to establish a desired ratio between organic and inorganic materials in the cracking chamber. The present invention is not specifically limited to any particularly ratio, but rather to the process generally by which a desired ratio of re-cycled, re-activated clay material may be established and maintained.

Once the desired conditions have been established as aforesaid, it will, of course, be necessary to withdraw from the process substantially the amount of clay or inorganic materials which are fed into it with the original raw materials in any given unit of time. For this purpose the materials from the line 99 are preferably divided and a portion passed through a heat interchanger 104 under control of a valve mechanism 105. In this heat interchanger a maximum amount of the heat from the hot clay type material to be removed is recovered for use for any desired purpose, such as in pre-heating the oil charge for the cracking chamber passing through the line 55. For this purpose there is shown branch lines 106 and 107 leading from the line 55 to the heat interchanger and thence back to the line 55 respectively, a valve 108 being interposed as shown in the line 106 and a suitable valve 109 being interposed in the line 55 between its connections with the lines 106 and 107, so as to control the proportion of the material passing through the line 55 which will be diverted to pass through the heat interchanger 104. Within the heat interchanger 104 there is shown a helical screw conveyor 110, which may serve to cause the movement of the clay material therethrough in a known manner, this material passing therefrom through a line pipe or duct 111 to any suitable disposal point. This clay may be disposed of by dumping it at any available point or may be used for any purpose for which it is suitable.

While there is shown and described herein but two embodiments of the invention, which are similar to one another in many respects, but show the use of certain variants in others, it is contemplated that other variations will occur to those skilled in the art. I do not wish to be limited, therefore, except by the scope of the appended claims, which are to be construed validly as broadly as the state of the prior art permits.

What is claimed is:

1. The process of treating rock asphalt, oil shales and like material, containing both oil-soluble hydrocarbon and oil-insoluble inorganic portions, to recover valuable petroleum products therefrom, which comprises the steps of dissolving the oil-soluble portion of such material in a solvent oil, which is produced at a subsequent step in the process, separating to a substantial extent the solution of the oil-soluble portion from the remaining material, processing the separated oil-soluble portion and the solvent oil to recover valuable petroleum products therefrom including a supply of said solvent oil and a quantity of a cracking stock, introducing said cracking stock and said remaining material into a cracking chamber, separately generating hot products of combustion and passing them into said cracking chamber to heat the materials passing therethrough to a temperature in the range of about 850° to about 1400° F., passing said materials from said cracking chamber to a vapor separator and therein vaporizing volatile portions thereof, separating the resultant vapor from the remaining non-volatile materials, processing such vapor to produce valuable cracked petroleum products therefrom including cracked high octane gasoline and a quantity of material similar in its characteristics to said cracking stock, passing said remaining non-volatile material into a combustion chamber and therein burning substantially all the combustible material therefrom, removing the non-combustible material from said combustion chamber, cooling a selected part of said non-combustible material and utilizing heat obtained therefrom for pre-heating said cracking stock en route to said cracking chamber, re-cycling the remaining part of said non-combustible material through the cracking process by introducing it into said cracking chamber so as to establish and maintain therein a predetermined ratio between inorganic and organic materials, utilizing heat derived from the combustion in said combustion chamber for further pre-heating said cracking stock en route to said cracking chamber, and re-cycling a selected amount of said material similar in its characteristics to said cracking stock by reintroducing such material along with said cracking stock into said cracking chamber so as to establish a predetermined ratio between this re-cycled material and said cracking stock in the materials introduced as aforesaid to said cracking chamber.

2. The process of treating rock asphalt and like material, containing both oil-soluble hydrocarbon and oil-insoluble inorganic portions, to recover valuable hydrocarbon products therefrom, which comprises the steps of dissolving the oil-soluble portion of such material in a solvent oil, separating to a substantial extent the solution of the oil-soluble portion from the remaining material, vaporizing the volatile portion of said solution of the oil-soluble portion and separating the resultant vapor by fractional condensation into a plurality of straight run fractions, one of which is suitable as a cracking stock, and one of which is suitable for use as said solvent oil, introducing said cracking stock and said remaining material into a cracking zone, heating the materials thus introduced into the cracking zone to a temperature in the range of about 850° F. to about 1400° F. while they are in the cracking zone, separating the effluent from the cracking zone into a vapor portion and a spent inorganic residue separating said vapor portion into a plurality of cracked hydrocarbon fractions, subjecting said spent inorganic residue to the action of an oxygen-containing gas at a temperature sufficient to burn out all combustible material therefrom to generate hot products of combustion and to produce a hot inorganic material suitable for use as a cracking catalyst, supplying heat from said hot products of combustion thus generated to said cracking zone, and reintroducing into said cracking zone a selected part of said hot inorganic material cracking catalyst so as to effect some catalytic cracking in said cracking zone and to establish and maintain in said cracking zone a predetermined ratio of inorganic to organic materials independently of the ratio of inorganic to organic materials in the original material supplied to the process.

JOHN W. COAST.

REFERENCES CITED

The following references are of record in the file of this patent:

UNITED STATES PATENTS

| Number | Name | Date |
| --- | --- | --- |
| 1,327,572 | Ryan | Jan. 6, 1920 |
| 1,357,278 | Day | Nov. 2, 1920 |
| 1,467,758 | Day | Sept. 11, 1923 |
| 1,475,901 | Thompson | Nov. 27, 1923 |
| 1,706,468 | Struben | Mar. 26, 1929 |
| 1,778,515 | Hampton | Oct. 14, 1930 |
| 2,339,932 | Kuhl | Jan. 25, 1944 |
| 2,406,810 | Day | Sept. 3, 1946 |